United States Patent [19]
Tangorra

[11] 3,870,095
[45] Mar. 11, 1975

[54] PNEUMATIC TIRE FOR VEHICLE WHEELS WITH INWARDLY DIRECTED SIDEWALL CONVEXITY

[75] Inventor: Giorgio Tangorra, Milan, Italy

[73] Assignee: Industrie Pirelli S.p.A., Milan, Italy

[22] Filed: July 23, 1973

[21] Appl. No.: 381,482

[30] Foreign Application Priority Data
Aug. 4, 1972  Italy .................................. 27897/72

[52] U.S. Cl. ........................ 152/353 C, 152/361 R
[51] Int. Cl. ......................... B60c 13/00, B60c 9/18
[58] Field of Search .......... 152/330 RF, 352, 353 C, 152/361 R

[56] References Cited
UNITED STATES PATENTS

| | | |
|---|---|---|
| 595,422 | 12/1897 | Van Zandt .................... 152/353 C |
| 1,337,660 | 4/1920 | Killen ................................ 152/353 |
| 1,862,269 | 6/1932 | Johnson ............................. 152/352 |
| 3,394,751 | 7/1968 | Sidles et al. .................... 152/330 RF |

Primary Examiner—Drayton E. Hoffman
Attorney, Agent, or Firm—Clelle W. Upchurch

[57] ABSTRACT

A pneumatic tire is disclosed for vehicle wheels wherein the tread is reinforced by an essentially rigid under tension annular structure with a width greater than the distance between the beads of the sidewalls. The sidewalls are made of an elastomeric material and are so shaped that they have an inwardly directed convexity under normal service pressure conditions. If a vertical load is applied to the tire, the sidewalls will react such that the distance from the median plane of the wheel will be increased causing a reduction in the inclination of the sidewalls by approaching a horizontal line.

13 Claims, 13 Drawing Figures

PNEUMATIC TIRE FOR VEHICLE WHEELS WITH INWARDLY DIRECTED SIDEWALL CONVEXITY

The present invention relates to an improved pneumatic tire for vehicle wheels, having specific and improved static and dynamic behavior, which tire can be easily manufactured at low cost.

In U.S. Pat. application Ser. No. 273,337 filed July 19, 1972 now U.S. Pat. No. 3,805,868 in the name of the present assignee, there is described and claimed a tire with a schematically trapezoidal section, whose tread incorporates a substantially inextensible annular reinforcement, and whose sidewalls are convex towards the inside and are subjected to compression as a result of the inflation pressure.

The present invention relates to a pneumatic tire of similar type, which possesses a very high load bearing capacity, a very high resistance to lateral stresses, and other desirable and improved static and dynamic features which will be apparent from the following description.

As the behavior of the tire according to the present invention is completely different from that of conventional tires, it will be explained as the description progresses with reference to the attached illustrative drawings, with the aid of appropriate diagrammatical representations, as necessary. In this way the functional and structural features of the tire according to the invention, as well as its exceptional advantages, will be clearly apparent.

Figure 4:
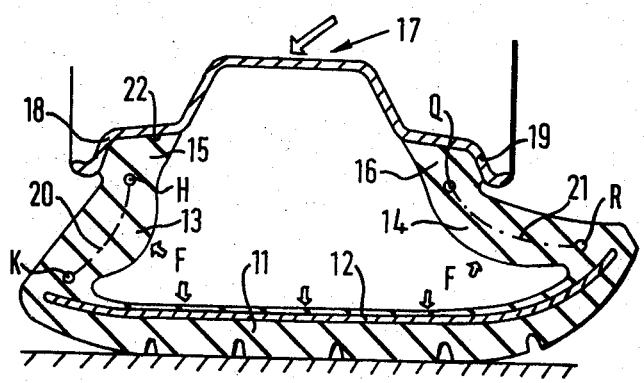
FIG. 4 is a section corresponding to that of FIG. 2, but showing the tire under the action of a lateral stress (caused for instance by the centrifugal force arising when the vehicle is cornering at high speed)
Figure 7:
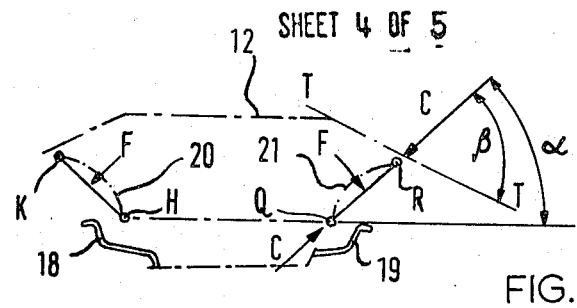
Figure 7A:
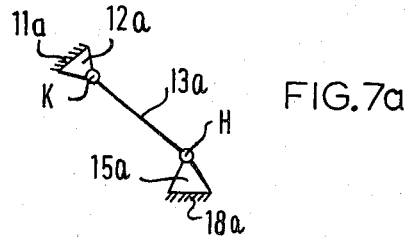
Figure 9:
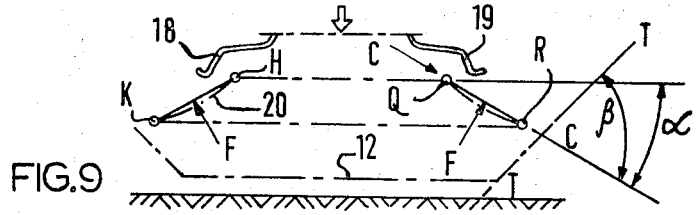
Figure 10:
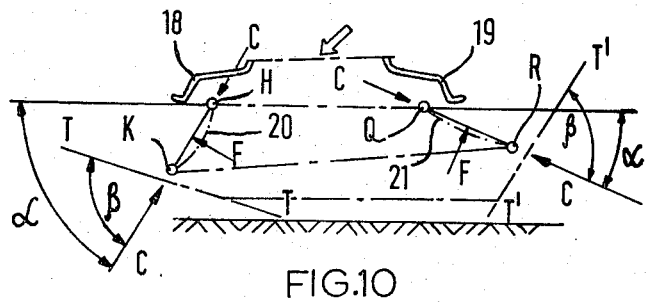
Figure 11:
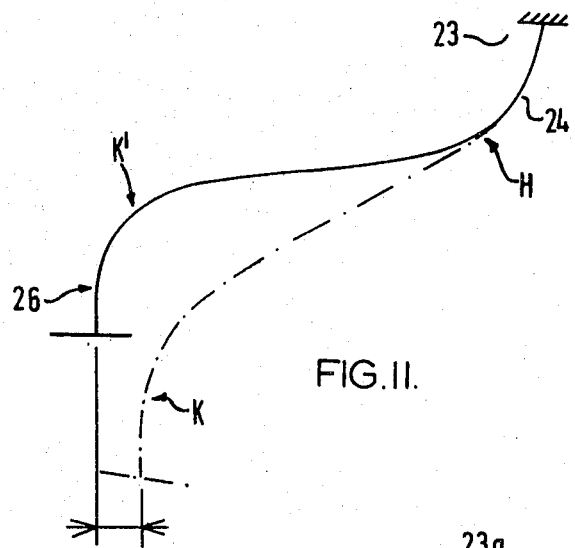
Figure 12:
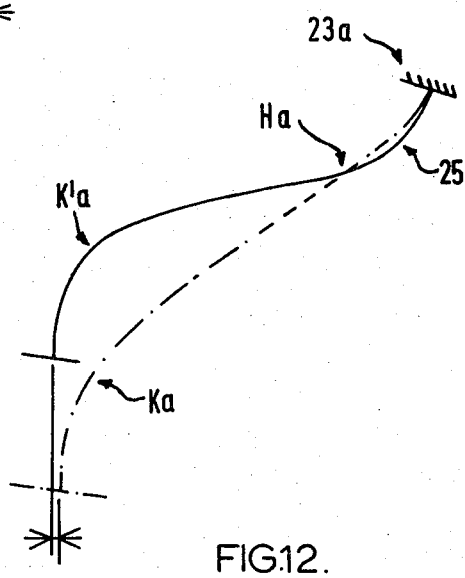

FIGS. 7 and 10 represent the geometrical features of the tire (to facilitate the understanding of some phenomena and of particular behavior conditions) when said tire is: deflated but unloaded (FIG. 7, corresponding to the condition of FIG. 5); inflated but unloaded (FIG. 8, condition of FIG. 1), inflated and under a centered load (FIG. 9, condition of FIG. 2), and inflated, loaded and stressed by a lateral force (FIG. 10, condition of FIG. 4);

FIG. 7a is a further partial scheme;

FIGS. 11 and 12 illustrate the deformations of the midline of the sidewalls of two tires according to the invention due to the application of even heavy loads, to clarify the meaning of some definitions and schemes.

Figure 1:
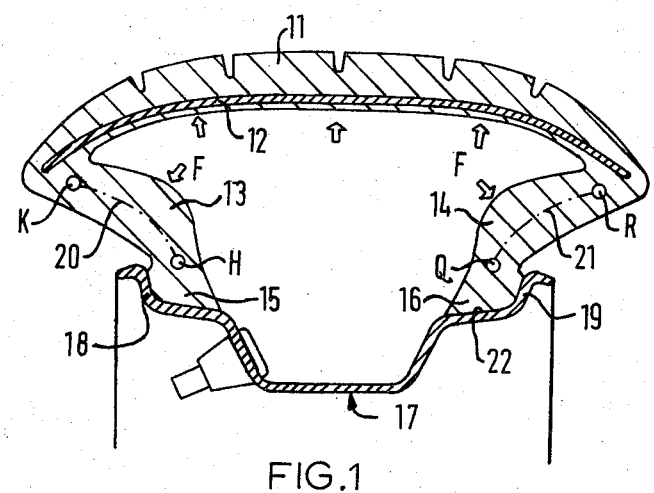
FIGS. 1 and 2 represent respectively the improved tire, inflated and under vertical load, in sections taken along the planes indicated with I—I and II—II, respectively, in FIG. 3 wherein the tire is shown in side view, with the aid of some characteristic profiles indicating its particular geometrical structure and its peculiar behavior.

As stated previously, the tire has a schematically trapezoidal section, as shown by way of example in FIG. 1. This figure illustrates a section of an example of a tire according to the invention, inflated and not subjected to load, taken along a plane passing through the tire axis and perpendicular to the median plane of the tire. The tire comprises a tread 11 provided with a reinforcing breaker 12, and two sidewalls 13 and 14, terminating with two beads 15 and 16 to be fitted on the rim. The rim is indicated with 17 and has two flanges 18, 19. In the figure, the reference numerals 20 and 21 indicate the median lines of the sidewalls which, as it can be seen, are convex towards the inside of the tire.

Figure 2:
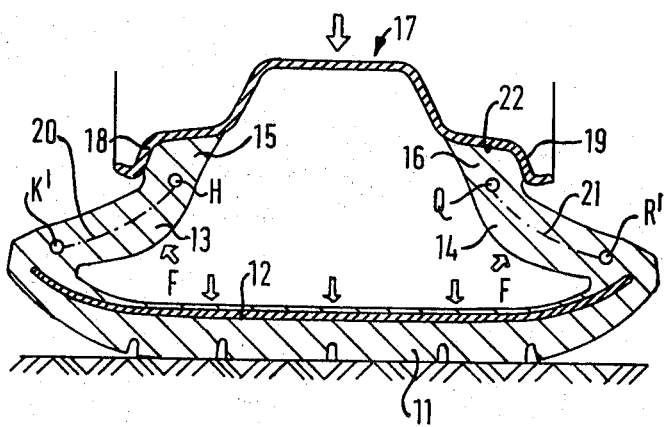

FIG. 2 represents the same tire under load. As can be seen from the drawing, the tread 11 is partially flattened, so that the vertical displacement of its edges is smaller than the displacement of its central point. The sidewalls 13, 14 have rotated in such a way as to reduce their inclination, namely to approach more closely to a horizontal plane.

The behavior, deformation and elastic reaction under load of the tires according to the invention are quite different from those of conventional tires presently used and, to understand their conditions and importance, it is advisable to resort to a diagrammatic representation of the tire according to the invention, shown as a trapezium in FIGS. 7 and 10 for this purpose. The greater base of the trapezium represents the chord of the tread (which, as visible in the figures, is the largest part of the tire). The smaller base of the trapezium represents the line joining the theoretical centers at which said trapezium is assumed as deformable, as it will be indicated and explained hereinafter, in proximity of the flanges. The two sides of the trapezium, which represent diagrammatically the two tire sidewalls, correspond substantially to the chords of the median lines of the sidewalls.

FIGS. 7 to 10 show said diagrammatic representation of the tire, in which the vertices of the trapezium are indicated with H, K, Q and R (the approximative positions of which are also reported in FIGS. 1, 2 and 4, 6). The median lines of the sidewalls are indicated by dotted lines and the curvature of the tread 12 is represented by a broken line whose extreme segments coincide with the tangents T—T (in first approximation) of the ends of the real curvature, seen in section, of said tread.

Figure 8:
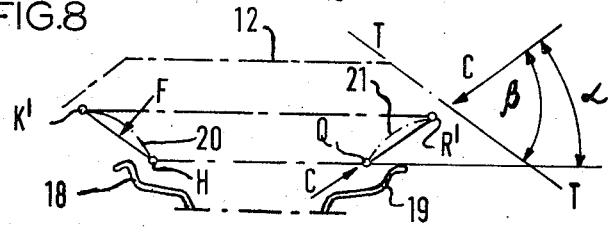

Considering initially the situation of the tire being inflated to the correct service condition, but not subjected to load, and represented in FIG. 1 and diagrammatically illustrated in FIG. 8, it can be seen that the sidewalls are subjected to a pressure, represented by a distribution of forces, which is perpendicular to their inner convex surface; FIGS. 1, 2, 4 and 7–10 indicate the resultant F of said distribution of forces, which is substantially perpendicular to the chord of the median line of the corresponding sidewall (always in first, but sufficient approximation).

Owing to the conformation and the elastic nature of the tire sidewalls, this pressure causes a reaction of compression inside the latter, and the reaction has a component parallel to the force F, equal and opposite to said force in order to annul it, and a perpendicular component, which can be considered as representative of the force of compression existing in the sidewalls, which is indicated by the two equal and opposite forces "C" in FIGS. 7–10. The indications of the figures are obviously diagrammatical and do not take into account the complex elastic behavior of the tire, particularly in its sidewalls, but they are sufficient for understanding the invention.

The ratio between the force "F," which is the resultant of the pressures, and the compression component C which is originated thereby, depends initially upon the shape of the tire and on the elastic characteristics of the rubber constituting it. As is known, the elastic behavior of rubber is not linear. Owing to the substantial inextensibility of the annular reinforcement of the tread (which will be dealt with hereinafter) and the rigidity of the rim, the length of the sides of the trapezium cannot greatly exceed that indicated in FIGS. 1 and 7, but may decrease according to the application of the load, or remain unchanged, or even slightly increase due to an outward displacement of the tread edges resulting from its squeezing.

To understand the supporting ability of the tire, reference is made to FIGS. 2 and 8 showing in dotted lines the position of the sidewalls corresponding to the application of a vertical load, and therefore to the rotation of the sidewalls to reduce their inclination. Points K and R have reached positions K' and R'. The load is applied to the two points H and Q. Besides the load, two forces are applied to these points; the first is generated by the internal pressure and the second, which can be called "prop force," results in the compression stresses existing in the sidewall. The first force, during the rotation of the sidewall, approaches the vertical direction; consequently it increases its vertical component which cooperates in bearing the load. Therefore there is a supporting mechanism due to the rotation of the sidewall. On the contrary, as regards the prop force, the rotation tends to approach it to the horizontal line, and therefore to reduce its contribution to the bearing ability of the tire (admitting that the entity of said force remains constant), thereby originating a "counter-support" mechanism.

It is clear that, in order to improve the load bearing ability of the tire, it is first of all advisable for the prop-force to be reduced with respect to that deriving from the pressure, and, possibly, to be increased instead of being reduced. As said force is related to the compression stresses existing in the sidewall, said compression stresses must be also increased — and not reduced — when increasing the load.

On the other hand, it can be seen that the support mechanism due to the force originated by the inner pressure tends to be the more efficient the greater the variation of the cosine of the angle formed by the line of application of the force with the vertical plane.

In FIGS. 7 and 10 the letter $\alpha$ indicates the angle between the chord representing the tire sidewall and the horizontal line or, more precisely, the direction of the tire axis. It can be said that the behavior of the tire forming the object of the invention is characterized in general by a continuous reduction of angle $\alpha$ with an increase in load; in other words, said angle $\alpha$, considered as a function of the load applied to the tire, is generically a monotonic decreasing function. Obviously, the rapidity of its decrease, for a stated increase of the load, determinates the greater or smaller ability of the tire to bear a relevant load without reaching the theoretical limit condition of its flattening in the area of contact with the ground.

In the embodiment shown in FIGS. 1 to 6 (and as better explained herebelow), the tire structure is such that, when the tire is inflated but not loaded, the angle is slightly smaller than 40°. Said angle could be greater than 40°, but cannot exceed 50°; it preferably ranges between 45° and 30°; however, once said angle is stated and the width of the tread is established, the schematic geometrical configuration of the tire, interpreted as a trapezium, does not vary and the length of the smaller side of said trapezium is not arbitrary.

As a maximum, the two vertices H and Q can be extremely close together, and the tire can take the approximate shape of a triangle. Preferably, the ratio between the two bases of the trapezium is advantageously maintained between 1–1.5 and 1–3.

Moreover, the length of the sidewalls, or more exactly of their chords, must be appropriately established in advance. From experimental tests, it has been determined that the ratio between the smaller base of the trapezium and each of the chords (HQ/HK = HQ/QR) is preferably maintained between 1–0.3 and 1–3.

As stated above, the fact of considering the sidewalls as hinged beams constitutes a schematic illustration.

First of all, the fitting of each bead 15 or 16 of the sidewall 13 or 14 to the flange 18 or 19 determinates the position of the zone in which the lower hinge of the sidewall can be diagrammatically considered as localized. If the bead were merely leaning on the flange, it could rotate with respect to the latter, and in the zone of contact 22 between the bead and the flange, a hinge would be obtained in a certain sense. According to the present invention, it is preferred to carry out a fixed connection between the bead and the flange in order that the former does not rotate with respect to the latter, said connection being considered as a joint. As a consequence of said connection, the hinge about which it can be assumed that the sidewall rotates is situated in the same body of the sidewall, in a position somewhat displaced with respect to the bead, namely at points H and Q. The sidewall is so shaped that in a narrow zone it suffers a flexional deformation, which can be interpreted as a rotation about a point of a hinge. To this purpose the sidewall section can be conveniently reduced in the desired zone, and the features of the rubber compound constituting it can be modified. It is however to be noted that an increase of deformation of the rubber leads to a reduction of its modulus of elasticity, with the consequence that, when the sidewall is thinned in the zone where one desires to situate the hinge, the deformation of the rubber is increased, so that it is less rigid under flexion, concentrating in itself the most part of the flexional deformations.

This effect can be enhanced by increasing the amount of carbon black in the rubber, which is often desirable for other reasons, in particular to obtain a high hardness, at least over 60° Shore, namely by using compounds containing more than 30% of carbon black or possessing such features as to correspond to a compound of such a composition.

It is clear that the hinge so obtained is an imperfect hinge, which reacts with a remarkable resisting moment. Analogous considerations are to be made for the other imperfect hinge, existing at K and R for each sidewall at the connection with the tread 11.

Obviously, the hinges considered above cannot be indicated with a mere geometrical definition, since they depend upon their links and upon the elastic behavior of the tire, as well as depending on the type of stress imparted by the vehicle's motion, and do not necessarily coincide with the points of the most reduced or minimum section of the sidewalls.

In order to better explain these concepts, FIGS. 11 and 12 illustrate the deformations of the median line of a sidewall of two tires according to the invention. The median line of the sidewall, when the tire is in inflated and unloaded condition, is indicated with a dotted line, while the same line, when the tire is deformed by vertical load, is indicated by a continuous line.

As can be seen from FIG. 11, the two lines are coincident in the zone adjacent the flange 23. The coincident lengths are indicated by 24. Obviously they are situated in the bead zone. The point in which the two lines separate can be considered with good approximation as the hinge H, which represents the point or center about which the mass of the sidewall rotates in said zone. It is to be noted that, beyond said point, the deformed line lies outside the original line, with respect to the median plane of the tire. The hinge K, adjacent the tread, is less easily located, because the displacement of the various points of the sidewall towards the rim, increases progressively in the direction of the tread due to the load. As the median line of the sidewall can also vary in its length in consequence of compression, it is not easy to establish an exact correspondence between the points of said line in the absence and in the presence of the load.

It can be noted, however, that the extreme points of the median line of the sidewall, in the two illustrated conditions, are nearly situated on the same line parallel to the median plane of the wheel, and, more precisely, the extreme point of the deformed line is slightly displaced towards the outside, with respect to the median plane of the wheel, as indicated at 26, and, in proximity of said extreme point, the tangent to said line negligibly varies its orientation by the load effect.

This indicates the presence of a connection similar to a joint between the sidewall and the tread, even if said joint is less marked and more imperfect than one existing between the sidewall and the flange. The partial flattening of the thread is also taken into account.

Hinge K, about which the sidewall bends, is located in proximity of the joint. The bending is visible in the figure. The center of the zone of maximum bending can be considered as represented by hinge K', which therefore can be located visually and indicated in the figure in a first but sufficient approximation.

FIG. 12 illustrates an analogous deformation of the median line, but for a different sidewall and under very severe load conditions. Therefore the same reference letters and numbers as those used in FIG. 11 have been adopted here, provided with suffix $a$. FIG. 12 illustrates however a still more severe deformation, in particular in the bead zone, whose bending is so marked that the deformed median line slightly re-enters towards the tire inside, as indicated in 25. In said case hinge $H_a$ can be localized in the point of crossing of the two lines, namely of the deformed line and of the hot deformed line.

It is necessary to bear in mind that, while FIGS. 11 and 12 illustrate and concern the whole development of the median line of the sidewall, comprising the zone of the bead and the zone of connection to the tread, in the remaining part of the specification the term "sidewall" refers only to that part between the two hinges. In particular, the condition in which the inclination of the sidewalls increases under load refers to the chord of that part of the sidewall which is located between two hinges, as it is clearly illustrated in FIGS. 7 to 10. Another manner of expressing this condition consists therefore in stating that the median lines of the sidewalls considered in their entirety, when the inflated tire is subjected to vertical load, increase their distance from the median plane of the wheel, with respect to the corresponding lines in the condition of inflated tire not subjected to load, with the possible exception of a small zone in the bead or adjacent to it (FIG. 12), or again that in the deformation due to load, the corresponding points of the two sidewalls of the tire never approach mutually, with the possible exception of a small zone in the bead or adjacent to it. These alternative formulations of the same condition have the advantage of not having to to take the location of the hinges into account.

In view of the above, the tire sidewalls can be schematically regarded as represented in FIG. 7a, only the left sidewall 13 being taken into account. The parts of the scheme are indicated by the same reference numerals defining the corresponding real parts of the structure, with the addition of the letter $a$.

The zone 15a, corresponding to the bead, constitutes the part to be fitted to the flange 18a of the rim, and is substantially fixed. The imperfect hinge, at H, connects said part to the central portion of the sidewall 13a, which is thickened and so shaped as to be substantially subjected to compression only.

It is followed by the imperfect hinge at K and by the connecting zone 12a with the tread 11a, which of course is not fixed, but approaches to the rim and can rotate under load, the angle formed thereby with the tread edge remaining substantially unchanged. The imperfect hinge at K can be less clearly identified, in relation to the lower rigidity of the connection between the tread and the sidewall with respect to the connection between the latter and the rim, as discussed supra.

Prevention of true deformations, due to elongation, in the hinge zones, is desirable and constitutes a preferred embodiment of the invention. It is clear that in said zones there are points in which flexion would tend to produce a tensile stress; more precisely said stress would take place at the intrados for the hinge adjacent the rim flange and at the extrados for that adjacent the tread. On the other hand, as the sidewall is precompressed, it is initially subjected to a compression stress. According to a preferred embodiment of the invention, the sidewall is so sized that it suffers an initial precompression stress, which should be due to its flexion under load. In this way the tendency of the fibers to elongate, stretched during said flexion, opposes their initial contraction without causing a true deformation by tension, namely an elongation.

It is to be cleared up that, although in the above description reference is made to zones subjected to compression only, it cannot be excluded that tension stresses are originated in some points during the tire working. These, however, are secondary and casual, and do not noticeably affect the tire behavior.

Another desirable condition in the sidewall structure is to reduce hysteresis to a minimum and therefore the heat development in the zones subjected to flexional deformation, i.e. the hinges.

From a first and superficial examination of the improved tire, in the limits of what is described above, one could think that strong flexion-resisting moments, repeated stresses of the material and also inversions of sign in said moments should be noticed in the imperfect hinge zones. According to a surprising geometrical and structural feature of the tire of the present invention, these prejudicial drawbacks take place only in a perfectly admissible extent. In this connection, it is necessary to consider separately the two imperfect hinges at H and Q (connection with the flanges 18 and 19 of the rim), and the two imperfect hinges at K and R (connection with the edge of the tread 11).

As already seen, the sidewalls 13 and 14 of the tire are convex towards the inside (taking into account the relative median lines 20 and 21). The load tends to reduce the angle $\alpha$, and the rotation of HK and QR towards the wheel axis, about the respective imperfect hinges at H and Q, is contrasted by the resisting moment generated by the unavoidable (although controllable) flexional rigidity of the material around H and Q. Therefore the sidewalls, owing to said moment, would theoretically tend to increase their curvature, namely to return to their "waiting" condition, when the tire is unloaded (FIGS. 1 and 8) or even to their "natural" condition, when the tire is deflated (FIGS. 5 and 7), which will be considered hereinafter. Therefore, with the exception of particular events (complete squeezing, exceptional asymmetrical deformations — also discussed hereinafter), the static and dynamic variations of the load, essentially centered, do not induce in the material deformations greater than those resulting from the application of the pressure and load.

Figure 5:
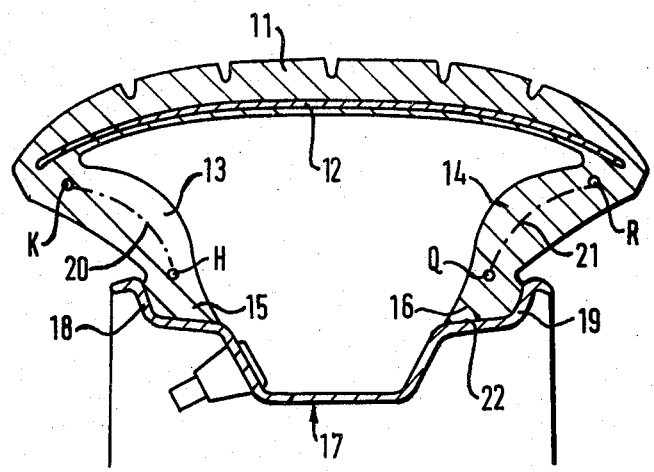
FIGS. 5 and 6 are sections respectively corresponding to those of FIGS. 1 and 2, with the tire in a deflated condition.

As regards the imperfect hinges at K and R, it is necessary to briefly recall some characteristics typical of the inextensible band 12. The band, as a result of its inextensibility, gives rise to circles, or better inextensible contours in its sections in each plane perpendicular to the wheel axis. In its right sections, namely in the phases containing said axis, the band is conventionally curved, with a convexity directed towards the outside, at a bending radius which decreases from the center towards the two edges (FIGS. 5 and 7). Under the inflation pressure, which applies to sidewalls 13 and 14 the force F tending to reduce their curvatures and to spread them, the distance between K and R tends to increase and the band 12 tends to become flat in its central portion (FIGS. 1 and 8). Under load, this flattening is strongly increased (FIGS. 2 and 9). Owing to the tangential, i.e., perimetral, inextensibility of the band 12, its curvature, in section, takes a progressively decreasing radius in its marginal portions, adjacent to K and R.

FIGS. 7 to 10 indicate with $\beta$ the angle formed by the tangent T—T of said curvature, at its ends, with the chord HK or QR of the adjacent sidewall.

FIGS. 1 to 6 represent, in a good graphical approximation, an improved tire, inflated but unloaded, which complies with the following conditions, without however constituting a limitation of the present invention:

(smaller base HQ/greater base KR) = 1 - 1.7 (approximately)
(smaller base/trapezium's sides) = 1 - 0.42 (approximately)
(the value of the smaller base which, depending on the size of the rim 17, represents the only really invariable parameter of the structure, having been taken as unity).

Further particular considerations are to be taken into account regarding the presence and the function of the inextensible reinforcement 12 in the tread. The reinforcement extends preferably beyond the prolongation of the median lines of the sidewalls in the connection zone to the tread, normally showing a curvature at least at its edges. It is important for the reinforcement to possess a very high rigidity to tension. The service pressures of the tires according to the invention are not dissimilar from those adopted for conventional tires; they range specifically from 1 to 8 atm for large-size truck tires to 20 atm for airplane tires. The rigidity of the reinforcements used must be such that they do not elongate, under the service pressure, by an extent exceeding a few units per thousand. This can be obtained for instance by using nylon reinforcements. By employing reinforcements made of steel cords, the elongation is nearly unperceivable and practically negligible, and even a negative elongation can be obtained by arranging the cords at certain angles.

The inflation pressure exerts on said reinforcement forces ranging from some hundred kgs to some tons. Under load and in the squeezed zone of the reinforcement, a reduction of the initial tension takes place. Said reduction, when reinforcements of this type are used, is transmitted to the whole development of the reinforcement, as if it were a compression stress, so that the reinforcement behaves as if it had an elastic modulus to compression.

The result is that the deformation which occurs in the area of contact with the ground is transmitted to the whole development of the tire, and a relevant part of the latter cooperates in reacting to load. It can be said that in the tire according to the invention more than one half, and in general at least 70% of the tire development, is concerned by the deformation. This is shown in FIG. 3, illustrating the tire under load in side view.

Figure 3:
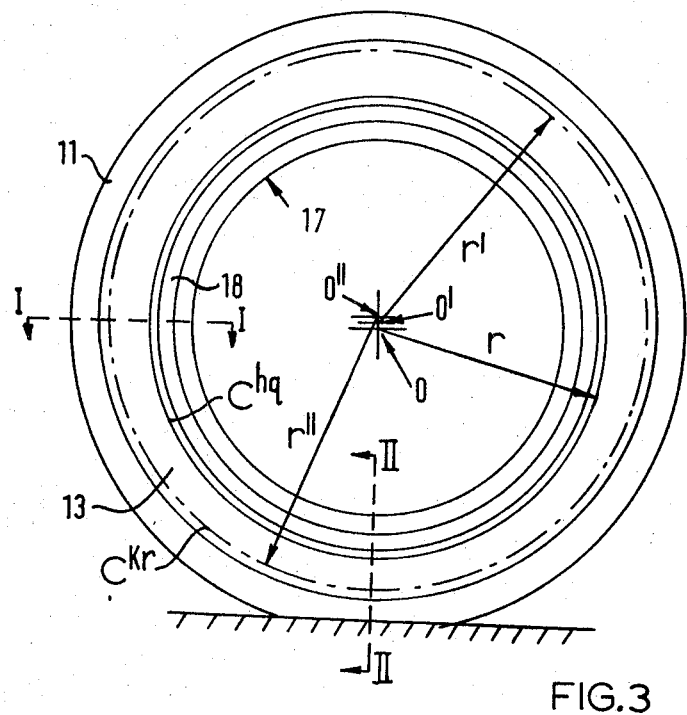

In FIG. 3 the continuous profile $C^{hq}$ represents the locus of all the points of imperfect hinge (vertices adjacent to the smaller base of the trapezium) H and Q. These points can be considered, in first but sufficient approximation, as fast with the adjacent flanges 18 and 19, so that said profile is a perfect circle, having its center at 0 in the wheel axis. The profile $C^{kr}$ represents instead the locus of the points K and R adjacent to the edges of the tread 11 and of the relative inextensible band. Consequently said profile is in its turn inextensible, but is (even if in a slight extent) deformed and displaced with respect to the wheel axis, in consequence of load. Also in first approximation it can be assumed that said profile $C^{kr}$ is displaced upward in its whole with respect to said axis. More precisely, its upper arc belongs to a circle having a radius $r'$ and its center at $O'$, and its lower arc belongs to a circle having a radius $r''$ and its center at $O''$. Obviously, the graphical representation of FIG. 3 is to be considered only in the meaning that it offers an indication of the type of deformation, but not of its entity.

It is obviously to be taken into account that the passage between the section deformed by the load (at the center of the area of contact with the ground) and that not deformed is gradual, as it takes place through the infinite intermediate sections. Further, owing to the apparent modulus of elasticity to compression of the imperfect hinges, and to the displacement upward of profile $C^{kr}$, the inclination of the sidewalls (angle $\alpha$), after having reached the value corresponding to that of the tire in inflated and unloaded condition (FIGS. 1 and 8) generally exceeds said value and induces a deformation of contrary sense in the top portion of the tire. It is evident that also this phenomenon can contribute to induce auxiliary support forces.

As is known, the favorable behavior of the tire depends in critical measure on its reaction to lateral stresses. FIGS. 4 and 10 illustrate, in a section analogous to that of FIGS. 1 and 2, the behavior of a cross section of the tire under lateral stress, as for instance on cornering.

As it is visible, the tire takes a dissymmetrical course. The sidewall indicated in the figure with 13, which in this case is that external to the curve, becomes shortened and compressed by approaching to the vertical line, while the sidewall 14, internal to the curve, does not shorten and can even slightly elongate, but rotates by following the localized deformation of the tread.

It has been found that the stability of the tire to lateral stresses is satisfactory when the angle $\alpha$ is such that its co-tangent is not remarkably smaller than the maximum total friction coefficient of the tire with respect to the ground which is foreseen for the tire use. In these conditions the tire can transmit the maximum friction force which can be generated by its contact with the road surface, without the external sidewall taking an unstable limit position corresponding to its complete vertical arrangement or, worse still, to the inversion of its inclination.

It is to be noted that the compression of the external sidewall 13 is very strong, for instance of the order of 20%. In said conditions the lateral load results in a very strong prop reaction. While the support under central or vertical load is due to the pneumatic pressure, the reaction to the lateral load involves the elastic reaction of the rubber, and said different reaction mechanism permits a new and particular series of functional results.

Figure 6:
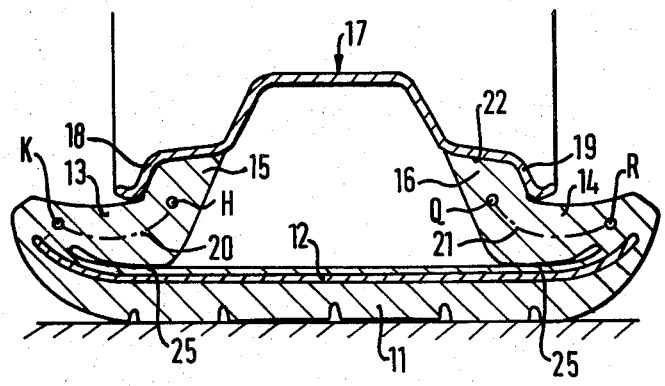

FIGS. 5, 6 and 7 illustrate the behavior of the tire according to the invention in the absence of the inflation pressure. In FIGS. 5 and 7 the tire is not loaded. From a comparison between FIGS. 1 and 5 and between FIGS. 7 and 8 it can be seen that, when the tire is deflated, the convexity of its sidewalls towards the inside is increased.

When the deflated tire is subjected to a vertical load, it behaves as indicated in FIG. 6; however, the convex shape of its sidewalls acts in such a way that only a part of them and not the whole sidewall, comes into contact with the tread. However, the tire behaves practically like a solid tire, since there are two lateral zones 25 in which the sidewalls are in contact with the tread, while at the same time the rim is kept separated from the tread. In these conditions the tire can work in a relatively normal way and for a sufficiently prolonged time, so that it can comply in a partically ideal manner with the safety requirements necessary for blow-out or accidental deflation, the achievement of which had been heretofore tried without obtaining quite satisfactory results.

From the above description and from an examination of the attached drawings, given by way of example and demonstration, the special, surprising and advantageous features of the improved tire are evident. These features are clearly in contrast not only with those of conventional tires, but also with those of some previous proposals which only apparently could be considered in some way similar to the geometry of the new tire. The main features of the latter can be summarized as follows:

The tire can be formed, in its whole, with an elastomeric material capable of exhibiting, under deformation to compression, characteristics of resistance to compression and to flexion. Materials of this kind can be obtained, as is well known, by means of appropriate "compounds," or rubber compositions, suitably loaded with carbon black and other known additives and, if desired, with small fibers of glass or of other materials in such an amount (which can be locally varied) and with such an orientation, which are the most convenient to confer, altogether or locally, the desired mechanical properties to the structure, in which the only heterogeneous component, intended to operate in different conditions of (tension) stress, is the inextensible reinforcing band for the tread. Anyhow, the possibility or the advisability of incorporating other tension-resistant elements, in particular at the beads, in order to ensure the permanent adhesion of the latter to the rim flanges, is not excluded.

With the exception of local and marginal conditions, due to the occurrence of transitory events of absolute casualness (impacts against big sharp obstacles, exceptional transversal thrusts and so on), the elastomeric material constituting the sidewalls is constantly subjected to compression at any point, as soon as the pneumatic pressure is initially applied in the inside of the tire. Moreover, the tire could be fitted on the rim already pre-loaded to compression at its sidewalls. Also in the event of running with a deflated tire (FIG. 6), the material forming the sidewalls works under compression and in conditions which are not excessively severe. A "bridge" is formed at 25 between the zones into contact, in which the band 12 works under tension, namely in its typical operating condition.

Owing to their construction, the sidewalls 13 and 14 have a curvature (convexity towards the inside), whose radius is variable in different points, but whose sense remains unvaried. Under the pressure of the load and of the dynamic stresses, the entity, namely the camber of said curvature is modified but never annulled (except in particular transitory events); further, the state of compression of the elastomeric material forming the sidewalls is not modified although its entity is varied. In this way it is possible to avoid practically those phenomena regarding the sign inversion of the applied forces which, as known, are the main cause of fatigue stresses, overheating and, in the course of time, deterioration and destruction of the material.

The geometrical shape of the right sections of the improved tire has been compared to that of a trapezium, and its alterations, under the loads constituted by pressure, weight and static dynamic stresses, have been compared to deformations of said trapezium, due to the rotation of its sides (and also of its greater base — asymmetrical deformation shown in FIGS. 4 and 10) about the adjacent vertices, considered as hinges. Said vertices have been situated at the points in which, with good approximation, it is possible to indicate the centers of the zones in which the deformation to flexion is in general prevalent. Owing to the properties of resistance to flexion of the elastomeric material, said hinges have been considered "imperfect," namely such as to provide a considerable resisting moment against the variation of the angle between adjacent sides. In particular, as it is evident from FIGS. 7 to 10, and taking into account that all of said stresses tend to reduce angle $\alpha$ (with the exception of the behavior of the "external" sidewall 13, FIG. 4), said resisting moment tends "to increase" the curvature of the sidewalls, while the resultant force F, due to the pneumatic pressure, tends to reduce it. Consequently, equilibrium conditions are continuously reached between the various forces, which simply result in a variation of the sidewalls' curvature, without inverting the sense of the latter, up to the limit condition of complete squeezing, represented in FIG. 6.

The particular geometrical configuration of the right sections of the improved tire, concerning also the curvature and the variations of curvature of the tread 11 and of the inextensible band 12, permits to obtain a reduced unforeseen fatigue stress of the elastomeric material also at the imperfect hinges at K and R.

In conclusion, and apart from any other consideration regarding the several advantageous aspects of simplicity and economy of production, the particular behavior of the improved tire, complying with the above discussed and analyzed essential geometrical and structural characteristics, permits to consider it as a "pneumatic" element, in the real meaning of the term, in which the properties of support (bearing capacity) and of elastic absorption of road irregularities are ensured by the gaseous pressures established and maintained inside. On the other hand, the variations of said bearing capacity, as a function of yielding and deformations of the tire sections, are controlled by the tire structure and by the variable pressure stresses to which its sidewalls are subjected; said sidewalls, as previously described, give a real contribution of elastic reaction, in particular by virtue of the prop forces, against the variable actions due to the static and dynamic loads applied in variable directions.

From what is described above it is moreover evident that the tire according to the invention can be formed in a very simple and cheap way by means of a mere molding operation, and without having to provide particular reinforcements, with the exception of reinforcing materials uniformly distributed on the material constituting the tire.

It must be noted that the tire has been described and is normally produced without an inner tube, although the use of an inner tube is not categorically excluded.

It is also to be noted that the normal supporting mechanism of the tire is related to the pressure and that the support forces derive from the latter and not by flexional reactions of the rubber itself; on the contrary, said reactions are advantageously minimized as much as possible.

What is claimed is:

1. In combination, a rigid rim of a vehicle wheel and a pneumatic tire, said rim having annular flanges adapted to receive and lock the beads of a tire in spaced apart relationship, said pneumatic tire comprising sidewalls having beads adapted to be locked in spaced apart relationship by said rim, a tread, an annular substantially rigid reinforcing structure reinforcing the tread and having a width which is greater than the spacing between the beads of the tire when mounted on the rim with the beads locked in position, said sidewalls being formed of a substantially elastomeric material, flaring from the beads towards the lateral ends of the tread and having an inwardly directed convex crosssection under normal inflation pressures, each sidewall forming a first imperfect hinge adjacent to the bead and forming a second imperfect hinge adjacent to the tread for rotation of the sidewall intermediate the hinges, whereby upon application of vertical loads to the tire, said intermediate portions rotate to reduce their inclination by approaching a horizontal line and the distances of said sidewalls from the median plane of the wheel increase at least in correspondence to said intermediate portion.

2. The pneumatic tire of claim 1 wherein the sidewalls react under the application of vertical loads such that their inclination is reduced to a minimum inclination determined by the contact of portions of the sidewalls with the inner surface of the tread.

3. The pneumatic tire of claim 1 wherein the inclination of the sidewalls under the inflation pressure and without the application of load when expressed as an angle between the wheel axis and the chord subtending the median line of the sidewall profile does not exceed 50°.

4. The pneumatic tire of claim 3 wherein the angle ranges between 30° and 45°.

5. The pneumatic tire of claim 1 wherein the rigidity of the tread reinforcement is sufficient to generate stress transmission in the circumferential development of the tire such that more than 50% of said development is concerned with deformattion due to the vertical load applied to the wheel.

6. The pneumatic tire of claim 5 wherein the rigidity of the tread reinforcement is sufficient to generate stress transmission in the circumferential development of the tire such that more than 70% of said development is concerned with deformation due to the vertical load applied to the wheel.

7. The pneumatic tire of claim 1 wherein the tire structure when under lateral stress will react by shrinking the external sidewall and by increasing its inclination, said sidewall being so sized as to provide the necessary reaction to compression such that its inclination does not reach a vertical line.

8. The pneumatic tire of claim 1 wherein the tire under inflation pressure but without the application of load will have an inclination of the tire sidewalls defined in terms of an angle between the wheel axis and the chord subtending the median line of the sidewall profile such that its co-tangent is not smaller than the maximum friction coefficient between the tread and the road surface contemplated for tire service.

9. The pneumatic tire of claim 1 wherein the bead of each sidewall is connected to the rim in order to prevent or reduce reciprocal rotation or slidings in the zone of contact, thereby creating a substantial fitting with respect to which said intermediate portion of the sidewall rotates under load about said hinge.

10. The pneumatic tire of claim 1 wherein the zones of flexional deformations are shaped and sized with respect to the deformations to compression due to the inflation pressure such that the maximum deformations to elongation of fibers contained therein which would be stretched as a result of the flexional deformation do not exceed the deformations to compression so there are no fibers subjected to a real tension in their entirety.

11. The pneumatic tire of claim 1 wherein said zones of flexional deformation are so shaped and sized taking into consideration the material forming said zones that the phenomena of elastic hysteresis and the relative heat generation are minimized.

12. The pneumatic tire of claim 1 wherein the tread has a curvature whose convexity is directed radially outwardly at least at its end portions.

13. The pneumatic tire of claim 1 wherein the sidewalls are connected to the end portions of the tread in such a fashion as to obtain a connection of substantially invariable angle with respect to the deformations of the tire under load.

* * * * *